United States Patent
Smith et al.

(10) Patent No.: US 11,097,370 B2
(45) Date of Patent: Aug. 24, 2021

(54) METHODS AND APPARATUS TO CONTROL AN OUTPUT OF A SWITCHED MODE POWER SUPPLY IN A SERVICE PACK

(71) Applicant: Illinois Tool Works Inc., Glenview, IL (US)

(72) Inventors: Alan F. Smith, Fremont, WI (US); Richard Joyce, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/513,133

(22) Filed: Jul. 16, 2019

(65) Prior Publication Data

US 2020/0023455 A1 Jan. 23, 2020

Related U.S. Application Data

(60) Provisional application No. 62/700,030, filed on Jul. 18, 2018.

(51) Int. Cl.
*B60R 16/03* (2006.01)
*H02J 7/14* (2006.01)
*B23K 9/10* (2006.01)
*H02J 7/00* (2006.01)

(52) U.S. Cl.
CPC ............ *B23K 9/1043* (2013.01); *B60R 16/03* (2013.01); *H02J 7/00* (2013.01); *H02J 7/0047* (2013.01); *H02J 7/0068* (2013.01); *H02J 7/1415* (2013.01)

(58) Field of Classification Search
CPC .......... B23K 9/1043; B60R 16/03; H02J 7/00; H02J 7/0047
See application file for complete search history.

(56) References Cited

U.S. PATENT DOCUMENTS

| 6,818,860 | B1 | 11/2004 | Stava | |
|---|---|---|---|---|
| 2009/0008368 | A1 | 1/2009 | Beeson | |
| 2009/0008374 | A1 | 1/2009 | Fosbinder | |
| 2014/0131329 | A1 | 5/2014 | Meckler | |
| 2016/0250707 | A1* | 9/2016 | Beeson | B60K 25/00 219/134 |
| 2018/0207741 | A1* | 7/2018 | Enyedy | B23K 9/1006 |

OTHER PUBLICATIONS

Int'l Search Report and Written Opinion Appln. No. PCT/US2019/042157 dated Oct. 25, 2019 (11 pgs).

\* cited by examiner

*Primary Examiner* — John W Poos
(74) *Attorney, Agent, or Firm* — McAndrews, Held & Malloy, Ltd.

(57) ABSTRACT

Methods and apparatus to control an output of a switched-mode power supply in a service pack are disclosed. An example power system includes: an engine; a generator configured to generate electrical power from mechanical power delivered by the engine; a switched-mode power supply, comprising an inverter, configured to convert the electrical power from the generator to output power, the output power comprising at least one of welding-type power or battery charging power; a user input device configured to receive an input selecting at least one of a first mode representative of a first welding-type process or a second mode representative of a first battery charging mode; and control circuitry configured to: when the first mode is selected, control the switched-mode power supply to output welding-type power; and when the second mode is selected, control the switched-mode power supply to output battery charging power.

9 Claims, 3 Drawing Sheets

METHODS AND APPARATUS TO CONTROL AN OUTPUT OF A SWITCHED MODE POWER SUPPLY IN A SERVICE PACK

BACKGROUND

This disclosure relates generally to work vehicles, and more particularly to methods and apparatus to control an output of a switched-mode power supply in a service pack.

Conventional engine-driven welding power sources provide welding power and battery-charging outputs, and include an input device, such as a rotary switch, to enable the user to select a particular weld process. Conventional engine-driven welding power sources also include a separate on/off toggle switch for battery charge mode, and another toggle switch for selecting the output voltage and/or current. When using conventional systems, the operator must use the weld process switch for selecting the weld process and the toggle switches for selecting battery charge.

SUMMARY

Methods and apparatus to control an output of a switched-mode power supply in a service pack are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
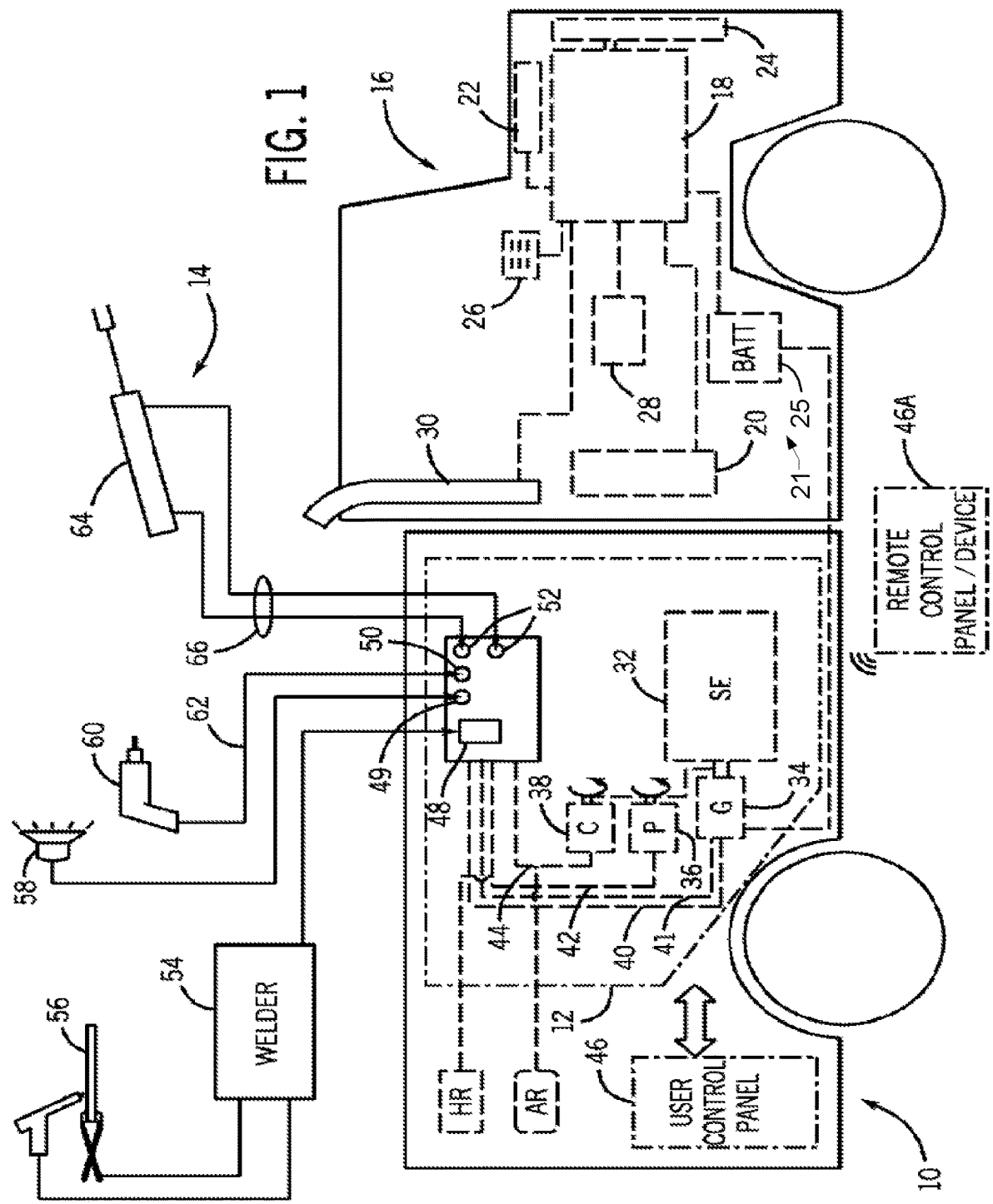
FIG. 1 is a diagrammatical overview of a work vehicle in which a service pack is installed, in accordance with aspects of the present disclosure.

Disclosed example methods and apparatus include one input device to select between two or more welding processes and one or more battery charging modes. In some examples, the input device is a rotary switch or a rotary encoder. In some examples, the input device has a single "battery charge" selection, and control circuitry automatically determines the type of connected battery, the voltage of the connected battery, and/or an appropriate charging mode of the connected battery. In some other examples, any one or more of the type of connected battery, the voltage of the connected battery, and/or an charging mode may be selectable via the input device and/or via separate input device(s).

In some examples, visible indicators (e.g., light emitting diodes or other visible indicators) are illuminated to indicate the selected process. When the input device is in a weld mode, the LEDs for weld processes are illuminated based on the process selected. Conversely, when the toggle switch is in the battery mode, the battery charge LEDs are illuminated depending on which battery charge mode is selected. Disclosed examples improve the ease of use for the operator, by enabling selection of all weld processes and battery charge/jump start modes via a single input device.

Welding-type power, as used herein, refers to power suitable for welding, plasma cutting, induction heating, electrode preheating, CAC-A and/or hot wire welding/preheating (including laser welding and laser cladding).

As used herein, the terms "power system," "service pack" and "auxiliary power unit" refer to an engine driven power source which may be auxiliary or supplemental to a primary power source such as a vehicle engine.

Disclosed example power systems include: an engine; a generator configured to generate electrical power from mechanical power delivered by the engine; a switched-mode power supply, comprising an inverter, configured to convert the electrical power from the generator to output power, the output power comprising at least one of welding-type power or battery charging power; and control circuitry configured to: receive an input selecting at least one of a first mode representative of a first welding-type process or a second mode representative of a first battery charging mode; when the first mode is selected, control the switched-mode power supply to output welding-type power; and when the second mode is selected, control the switched-mode power supply to output battery charging power.

In some examples, the switched-mode power supply is configured to output the welding power or the battery charging power via welding-type terminals. In some examples, the switched-mode power supply is configured to output the battery charging power to an electrical system of a work truck. In some example power systems, the user input device is configured to receive an input selecting at least one of a hydraulic output, a pneumatic output, a second welding-type process, or a second battery charging mode. In some examples, the first battery charging mode includes a first output voltage and the second battery charging mode includes a second output voltage. In some examples, the first battery charging mode includes a first output current limit and the second battery charging mode includes a second output current limit higher than the first output current limit.

In some example power systems, the first welding-type process includes at least one of a gas metal arc welding process, a flux cored arc welding process, a shielded metal arc welding process, a tungsten inert gas welding process, an induction heating process, a cutting process, or a gouging process, and wherein the second welding-type process comprises at least one of the gas metal arc welding process, the flux cored arc welding process, the shielded metal arc welding process, the tungsten inert gas welding process, the induction heating process, the cutting process, or the gouging process. In some examples, the control circuit is configured to, when the second mode is selected: automatically detect an output voltage of a connected energy storage device; and control the switched-mode power supply to output the battery charging power based on the detected output voltage.

Some example power systems further include one or more output indicators configured to indicate a status of battery charging when the second mode is selected. In some examples, wherein the one or more output indicators indicate at least one of: charging in a rapid charging mode, charging in a trickle charging mode, a battery test mode, an output voltage, or a charging error. Some example power systems further include a user input device configured to receive the input.

Turning now to the drawings, and referring first to FIG. 1, a work vehicle 10 is illustrated. The work vehicle 10 is shown as a work truck, although any suitable configuration for the vehicle may be envisaged. In the illustrated embodiment, the vehicle includes a service pack, designated generally by reference numeral 12 for supplying electrical, compressed air and hydraulic power to a range of applications, designated generally by reference numeral 14. The work vehicle 10 has a main vehicle power plant 16 based around a vehicle engine 18. Example work vehicle engines of this type may be diesel engines, gasoline engines, and/or mixed ethanol-gasoline engines.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. A cooling system 24, which will typically include a radiator, circulation pump, a thermostat-controlled valve and a fan, provides for cooling the engine. An electrical system includes an alternator or generator, along with one or more system batteries, cabling for these systems, cable assemblies routing power to a fuse box or other distribution system, and so forth. A lube oil system 28 will typically be included for many engine types, such as for diesel engines. As will be appreciated by those skilled in the art, such lube oil systems typically draw oil from the diesel engine crankcase, and circulate the oil through a filter and cooler, if present, to maintain the oil in good working condition. Finally, the power plant 16 will be served by an exhaust system 30 which may include catalytic converters, mufflers, and associated conduits.

The service pack 12 may include one or more service systems driven by a service engine 32. In some examples, the service pack 12 provides electrical power, hydraulic power and compressed air for the applications 14. In the diagrammatical representation of FIG. 1, for example, the service engine drives a generator 34 as well as a hydraulic pump 36 and air compressor 38. The engine itself may be of any desired type, but in a present embodiment a diesel engine is contemplated. Certain examples may use gasoline, diesel, natural gas, liquid petroleum gas, three-phase brush-type generators, and/or other engines. The generator 34 may be directly driven by the service engine 32, such as by close coupling the generator 34 to the service engine 32, or may be belt or chain driven, where desired. Presently contemplated generators include three-phase brushless types, capable of producing power for a range of applications. However, other generators may be employed, including single-phase generators and generators capable of producing multiple power outputs. The hydraulic pump 36 may be based on any conventional technology, such as piston pumps, gear pumps, vane pumps, with or without closed-loop control of pressure and/or flow. The air compressor 38 may also be of any suitable type, such as a rotary screw air compressor or a reciprocating compressor based upon one or more reciprocating pistons.

The systems of the service pack 12 will include appropriate conduits, wiring, tubing and so forth for conveying the service generated by these components to an access point. Convenient access points will be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply), whereas the hydraulic pump 36 is coupled to hydraulic circuit 42, air compressor 38 is coupled to an air circuit 44. As will be appreciated by those skilled in the art, the wiring and circuitry for all three systems will typically include protective circuits for the electrical power, including fuses, circuit breakers, and so forth, as well as valving for the hydraulic and air service. For the supply of electrical power, certain types of power may be conditioned (e.g., smoothed, filtered, etc.), and 12 volt power output may be provided by rectification, filtering and regulating of AC output. Valving for hydraulic power output may include by way example, pressure relief valves, check valves, shut-off valves, as well as directional control valving. Moreover, it should be understood that, although not represented specifically in FIG. 1, the hydraulic pump will draw fluid from and return fluid to a fluid reservoir, which will typically include an appropriate vent for the exchange of air during use with the interior volume of the reservoir, as well as a strainer or filter for the hydraulic fluid. Similarly, the air compressor 38 will typically draw air from the environment through an air filter (not shown).

In some examples, the generator 34 is also coupled to the vehicle electrical system, and particularly to the vehicle battery. Thus, as described below, not only may the service pack 12 allow for 12 VDC and/or 24 VDC loads to be powered without operation of the main vehicle engine 18, but the vehicle battery may serve as a shared battery, and is maintained in a good state of charge by the service pack generator output.

The cabling and conduits 40, 41, 42 and 44 may, as in the illustrated embodiment, route service for all of these systems directly from connections on the service pack 12. In a presently contemplated embodiment, for example, connections are provided at or near a base of an enclosure of the service pack 12, such that connections can be easily made without the need to open the enclosure. Moreover, certain control functions may be available from a control and service panel 46. The service panel 46, as noted above, may be located on any surface of the vehicle, or on multiple locations in the vehicle, and may be covered by doors or other protective structures, where desired. There is no requirement, generally, that the service panel 46 be located at the same location, or even near the locations of access to the electrical, hydraulic or compressed air output points of the service pack. In a presently contemplated embodiment, the panel is provided in a rear compartment covered by an access door. The control and service panel 46 may permit, for example, starting and stopping of the service engine 32 by a keyed ignition or starter button. Other controls for the engine may also be provided on the control and service panel 46. The control and service panel 46 may also provide operator interfaces for monitoring the service engine 32, such as fuel level gages, pressure gages, as well as various lights and indicators for parameters such as pressure, speed, and so forth. The service panel may also include a stop, disconnect or disable switch (not separately shown) that allows the operator to prevent starting of the service engine 32, such as during transport.

As also illustrated in FIG. 1, a remote control panel or device 46A may also be provided that may communicate with the service panel 46 or directly with the service pack via cabling or wirelessly. In a manner similar to conventional crane or manlift controls, then, the operator may start and stop the service engine 32, and control certain functions of the service pack (e.g., engagement or disengagement of a clutched component, such as an air compressor) without directly accessing either the components within the service pack enclosure or the service panel 46.

As noted above, any desired location may be selected as a convenient access point for one or more of the systems of the service pack. In the illustrated embodiment, for example, one or more alternating current electrical outputs, which may take the form of electrical receptacles 48 (for AC power, such as 120 VAC and/or 240 VAC power) and 49 (for DC power, such as 12 VDC and/or 24 VDC power) are provided. The service panel 46 may enable a user to select output configurations for the receptacles 48, 49. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC receptacle 48, and may provide constant current or constant voltage-regulated power suitable for a welding application. As will be appreciated by those skilled in the art, the welder 54 itself may receive power from the electrical output of the generator, and itself contain circuitry designed to provide for appropriate regulation of the output power provided to cables suitable for a welding application 56. Some examples include welders, plasma cutters, and so forth, which may operate in accordance with any one of many conventional welding techniques, such as gas metal arc welding (GMAW), shielded metal arc welding (SMAW), flux-cored arc welding (FCAW), gas tungsten arc welding (GTAW), and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired.

Similarly, DC loads may be coupled to the DC receptacle 49. Such loads may include lights 58, or any other loads that would otherwise be powered by operation of the main vehicle engine. It should also be noted that, as mentioned above, the 12 Cvolt DC output of the service pack also serves to maintain the vehicle battery charge, and to power any ancillary loads that the operator may need during work (e.g., cab lights, hydraulic system controls, etc.).

The pneumatic and hydraulic applications may be similarly be coupled to the service pack as illustrated diagrammatically in FIG. 1. For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic circuit 42 by means of appropriate hoses or conduits 66. As noted above, and as will be appreciated by those skilled in the art, certain of these applications, particularly the hydraulic applications, may call for the use of additional valving, particularly for directional control and load holding. Such valving may be incorporated into the work vehicle or may be provided separately either in the application itself or intermediately between the service pack and the hydraulic actuators. It should also be noted that certain of the applications illustrated diagrammatically in FIG. 1 may be incorporated into the work vehicle itself. For example, the work vehicle may be designed to include a man lift, scissor lift, hydraulic tail gate, or any other driven systems which can be coupled to the service pack and driven separately from the main vehicle engine.

The service pack 12 may be physically positioned at any suitable location in the vehicle. In a presently contemplated embodiment, for example, the service engine 32 may be mounted on, beneath or beside the vehicle bed or work platform rear of the vehicle cab. In many such vehicles, for example, the vehicle chassis may provide convenient mechanical support for the engine and certain of the other components of the service pack. For example, steel tubing, rails or other support structures extending between front and rear axles of the vehicle may serve as a support for the service engine 32. It should be noted that, depending upon the system components selected and the placement of the service pack 12, reservoirs may be provided for storing hydraulic fluid and pressurized air (denoted HR and AR, respectively in FIG. 1). As will be appreciated by those skilled in the art, however, the hydraulic reservoir may be placed at various locations or even integrated into the service pack enclosure. Likewise, depending upon the air compressor selected, no reservoir may be required for compressed air.

In use, the service pack will provide power for the on-site applications completely separately from the vehicle engine. That is, the service engine 32 generally may not be powered during transit of the vehicle from one service location to another, or from a service garage or facility to a service site. Once located at the service site, the vehicle may be parked at a convenient location, and the main engine 18 may be shut down. The service engine 32 may then be powered, to provide service from one or more of the service systems described above. Where desired, clutches, or other mechanical engagement devices may be provided for engagement and disengagement of one or more of the generator, the hydraulic pump and the air compressor, depending upon these service are required. Moreover, as in conventional vehicles, where stabilization of the vehicle or any of the systems is require, the vehicle may include outriggers, stabilizers (not shown), and so forth which may be deployed after parking the vehicle and prior to operation of the service pack. One or more of the services provided by the work vehicle 10 may be performed without the need to operate the main vehicle engine at a service site.

Figure 2:
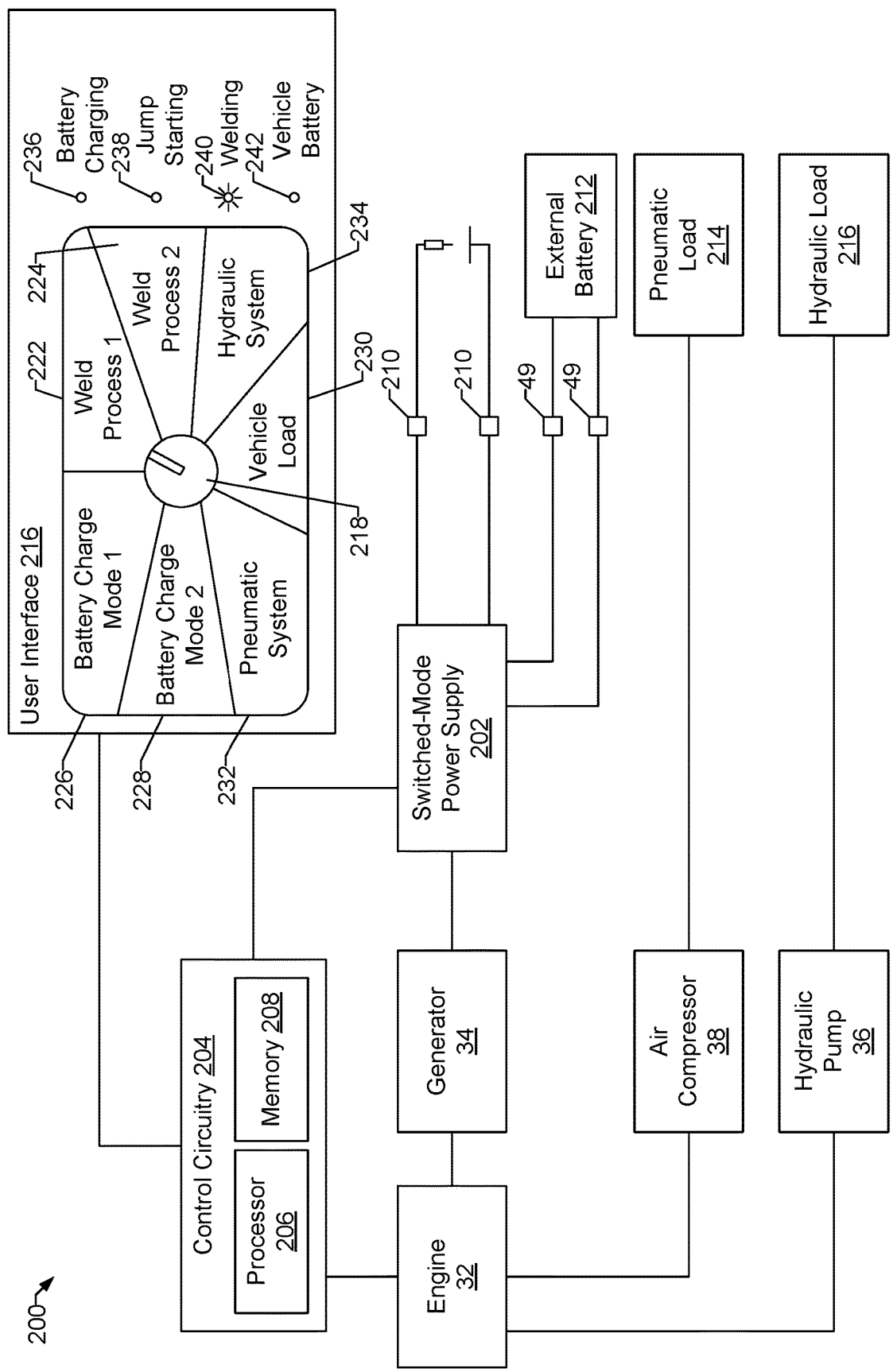
FIG. 2 is a block diagram of an example power system that may be used to implement the service pack of FIG. 1.

FIG. 2 is a block diagram of an example power system 200 that may be used to implement the service pack 12 of FIG. 1. The example power system 200 includes the service engine 32, the generator 34, the hydraulic pump 36, the air compressor 38, a switched-mode power supply 202, and the control circuitry 204.

The switched-mode power supply 202 converts the electrical power from the generator 34 to output power. Generally, the switched-mode power supply 202 includes a rectifier, a boost converter, an inverter, a transformer, an output stage, and/or any other circuitry. However, other configurations of the switched-mode power supply 202 may be used. The output power may include welding-type power, and/or non-welding AC and/or DC electrical power (e.g., DC battery charging power). In some examples, the generator 34 outputs AC power at a predetermined voltage (e.g., 120 VAC, 240 VAC) and a predetermined frequency (e.g., 50 Hz, 60 Hz, 400 Hz).

The control circuitry 204 includes one or more processor(s) 206 and a machine readable memory 208 or other storage device to store instructions for execution by the processor(s) 206. The example control circuitry 204 controls the output of the switched-mode power supply 202 based on the desired load or task. In some examples, the control circuitry 204 and/or a separate engine control unit (ECU) control the speed of the engine 32, which controls an input to the switched-mode power supply 202 (via the generator 34). For example, the control circuitry 204 may control switching elements of the boost converter and/or the inverter stages of the switched-mode power supply 202 to control voltage, current, frequency, and/or other characteristics of the output from the switched-mode power supply 202. The control circuitry 204 may control the switched-mode power supply 202 to provide voltage-controlled welding power, current-controlled welding power, battery-charging power, AC power for electrical tools, and/or any other type of welding-type and/or non-welding-type electrical power. For example, the switched-mode power supply 202 may output welding-type power via welding terminals 210, and/or non-welding power via the DC receptacle 49. For example, the switched-mode power supply 202 may output DC power to charge an external battery 212 via the DC receptacle 49.

The air compressor 38 provides air pressure to one or more pneumatic load(s) 214, such as pneumatically powered tools. The hydraulic pump 36 provides hydraulic power to one or more hydraulic load(s) 215.

The power system 200 includes a user interface 216, which includes an input device 218. The input device 218 is configured to receive inputs selecting mode(s) 222, 224 representative of welding-type processes, mode(s) 226, 228 representative of one or more battery charging modes, mode(s) 230 representative of a vehicle load, and/or other modes such as a pneumatic load 232, and/or a hydraulic load 234. The example user interface 216 further includes indicators 236, 238, 240, 242. The example input device 218 is a rotary encoder device, and provides a signal to the control circuitry 204 based on the selected mode 222-234.

The example user interface 216 may further include controls configured to modify welding and/or battery charging parameters, such as a welding voltage setpoint, a welding wire feed speed setpoint, a welding current setpoint, a nominal battery output voltage, a workpiece material thickness, welding wire parameters (e.g., thickness, type, etc.), a DC output current limit, and/or any other parameters. In some examples, the control circuitry 204 automatically determines one or more welding and/or battery charging parameters based on the input device 218 and additional controls, such as by determining a welding voltage and wire feed speed based on a specified material thickness.

The control circuitry 204 receives an input selecting one or more of the modes 222-234 from the user interface 216 (e.g., from the input device 218). Additionally or alternatively, the control circuitry 204 may receive the input selecting one or more of the modes 222-234 via a wireless or wired interface to an external device. For example, the control circuitry 204 may be communicatively connected to a computer, a smartphone, tablet computer, and/or any other operator interface device (e.g., via communication circuitry 244), through which an operator can control the power system 200 (e.g., select any of the modes 222-234 for operation).

Example welding-type process modes 222, 224 include a gas metal arc welding process, a flux cored arc welding process, a shielded metal arc welding process, a tungsten inert gas welding process, an induction heating process, a cutting process, or a gouging process. In some other examples, the modes 222, 224 may include predetermined welding schedules corresponding to sets of welding parameters. Example battery charging modes 226, 228 may include bulk or constant current charging mode, absorption or constant voltage charging mode, float mode, and/or jump starting mode. Additionally or alternatively, the battery charging modes 226, 228 are divided by nominal voltage of the subject battery, such as 12 VDC nominal voltage or 24 VDC nominal voltage, and the control circuitry 204 manages the charging modes. In some examples, two or more battery charging modes may specify the current limit, such as a first current limit for battery charging and a second current limit for jump starting an engine.

While the example input device is a rotary encoder, other types of input devices may be used, such as a rotary switch, a pushbutton switch, a menu selection, a touchscreen, and/or any other input device. Additionally or alternatively, the indicators 236-242 may be replaced by a digital display, an LCD display, conventional indicator lights, and/or any other indicator device. While the indicators 236-242 correspond to example modes of operation (e.g., a battery charging indicator 236, a jump starting indicator 238, a welding indicator 240, and a vehicle battery indicator 242), the indicators 236-242 may correspond to other modes of operation. For example, the user interface 216 may include an indicator for each weld process, battery charging mode, and/or other output that may be selected and/or output by the power system 200.

The control circuitry 204 determines the selected mode of operation of the switched-mode power supply 202 based on the signal from the input device 218, and controls the indicators 236-242 based on the selected mode of operation. For example, when one of the welding processes 222, 224 is selected, the control circuitry 204 controls a "welding" indicator 240 to be illuminated. The control circuitry 204 further controls the switched-mode power supply 202 to output power based on the selected mode of operation. The example control circuitry 204 may also control a speed of the engine 32 based on the selected mode of operation and the current load on the switched-mode power supply 202.

Figure 3:
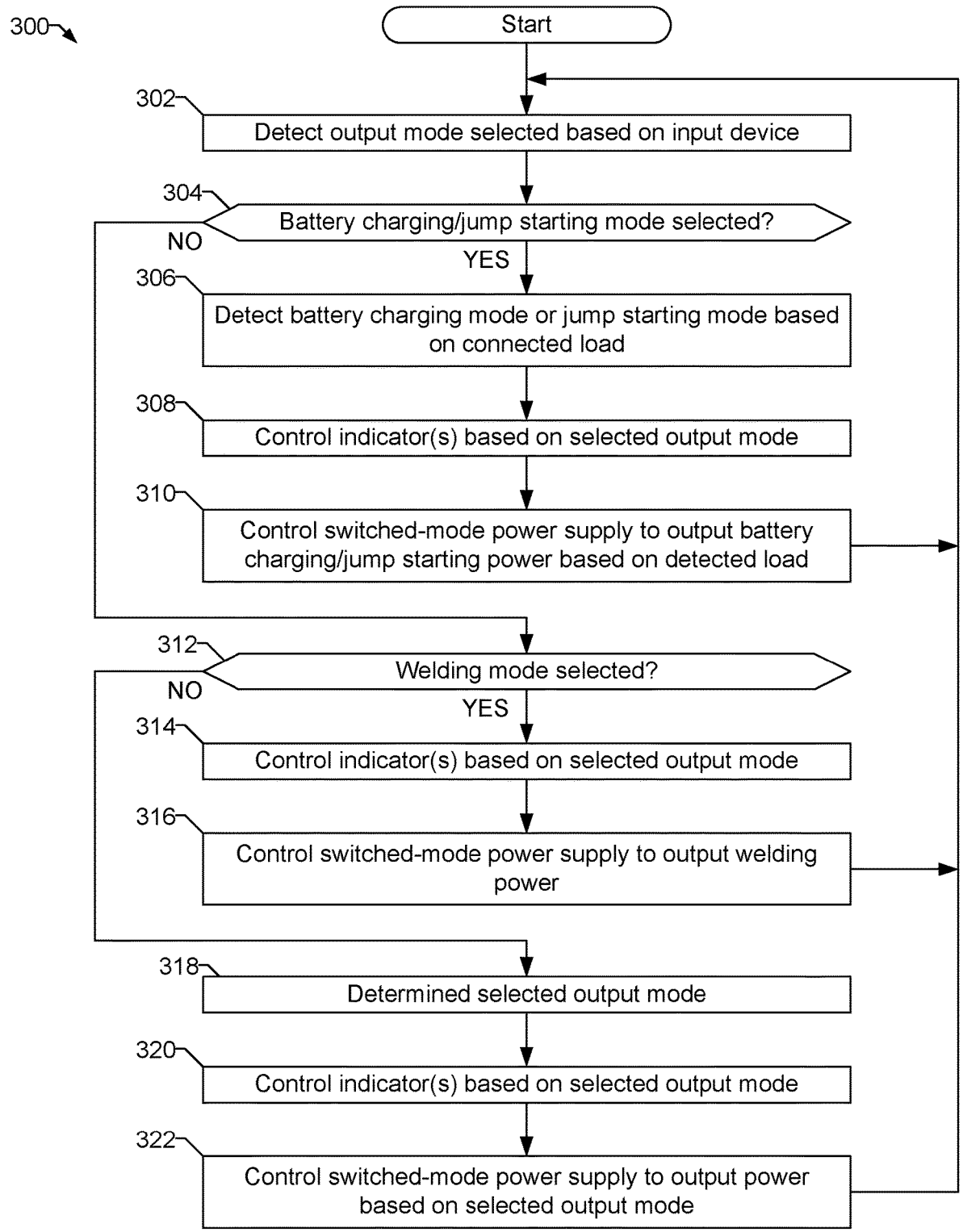
FIG. 3 is a flowchart representative of example machine readable instructions which may be executed by the example control circuitry to control an output of a switched-mode power supply in a service pack.

FIG. 3 is a flowchart representative of example machine readable instructions 300 which may be executed by the example control circuitry 204 to control an output of a switched-mode power supply in a service pack (e.g., the power system 200 of FIG. 2). The example instructions 300 will be described with reference to the power system 200 of FIG. 2. The instructions 300 may be executed while the engine 32 is running.

At block 302, the control circuitry 204 detects a selected output mode based on the input device 318. For example, if the input device 318 is a rotary encoder, the input device 318 may provide an output signal to the control circuitry 204 based on a position of the rotary encoder.

At block 304, the control circuitry 204 determines whether a battery charging and/or jump starting mode is selected. If a battery charging and/or jump starting mode is selected (e.g., via the input device 318) (block 304), at block 306 the control circuitry 204 detects a battery charging mode or a jump starting mode based on the connected load. For example, the control circuitry 204 may detect a voltage or output current of a device connected to the DC receptacle 49. A detected voltage less than a threshold may cause the control circuitry 204 to select a bulk charging mode.

At block 308, the control circuitry 204 controls one or more indicators 236-242 based on the selected output mode. For example, the control circuitry 204 may control the battery charging indicator 236 to illuminate when a battery charging mode is selected and control the jump starting indicator 238 to illuminate when a jump starting mode is selected. At block 310, the control circuitry 204 controls the switched-mode power supply 202 to output battery charging or jump starting power based on the detected load.

While the example blocks 304-310 reflect battery charging and jump starting modes being selectable via a same input device position, in other examples the battery charging mode and/or the jump starting mode is specifically selectable via the input device 218.

If the battery charging and/or jump starting mode is not selected (block 304), at block 312 the control circuitry 204 determines whether a welding mode is selected. For example, the welding mode may generally specify welding and/or may specify a specific welding process. If a welding mode is selected (block 312), at block 314 the controls the one or more indicators 236-242 based on the selected output mode. At block 316, the control circuitry 204 controls the switched-mode power supply 202 to output welding power. For example, the control circuitry 204 may control the switched-mode power supply 202 based on a welding process selected via the input device 218 and/or based on welding parameters selected using one or more other input devices.

If the welding mode is not selected (block 312), at block 318 the control circuitry 204 determines a selected output mode. For example, the vehicle output mode 230, the pneumatic output mode 232, the hydraulic output mode 234, and/or any other non-welding and/or non-battery charging output mode may be selected via the input device 218. At block 320, the control circuitry 204 controls the indicator(s) 236-242 based on the selected output mode. At block 322, the control circuitry 204 controls the switched-mode power supply to output power based on the selected output mode.

After controlling the switched-mode power supply (block 322, block 316, or block 310), the control circuitry 204 returns control to block 302.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system, comprising:
    an engine;
    a generator configured to generate electrical power from mechanical power delivered by the engine;
    a switched-mode power supply, comprising an inverter, configured to convert the electrical power from the generator to output power, the output power comprising at least one of welding-type power or battery charging power; and
    control circuitry configured to:
        receive, from a user input device, a first input selecting at least one of a first mode representative of a first welding-type process or a second mode representative of a first battery charging mode;
        when the first mode is selected, control the switched-mode power supply to output welding-type power; and
        when the second mode is selected, control the switched-mode power supply to output battery charging power,
        wherein the user input device is configured to receive a second input selecting at least one of a hydraulic output, a pneumatic output, a second welding-type process, or a second battery charging mode.

2. The power system as defined in claim 1, wherein the switched-mode power supply is configured to output the welding power or the battery charging power via welding-type terminals.

3. The power system as defined in claim 1, wherein the switched-mode power supply is configured to output the battery charging power to an electrical system of a work truck.

4. The power system as defined in claim 1, wherein the first battery charging mode comprises a first output voltage and the second battery charging mode comprises a second output voltage.

5. The power system as defined in claim 1, wherein the first battery charging mode comprises a first output current limit and the second battery charging mode comprises a second output current limit higher than the first output current limit.

6. The power system as defined in claim 1, wherein the first welding-type process comprises at least one of a gas metal arc welding process, a flux cored arc welding process, a shielded metal arc welding process, a tungsten inert gas welding process, an induction heating process, a cutting process, or a gouging process, and wherein the second welding-type process comprises at least one of the gas metal arc welding process, the flux cored arc welding process, the shielded metal arc welding process, the tungsten inert gas welding process, the induction heating process, the cutting process, or the gouging process.

7. The power system as defined in claim 1, wherein the control circuit is configured to, when the second mode is selected:
    automatically detect an output voltage of a connected energy storage device; and
    control the switched-mode power supply to output the battery charging power based on the detected output voltage.

8. The power system as defined in claim 1, further comprising one or more output indicators configured to indicate a status of battery charging when the second mode is selected.

9. A power system, comprising:
an engine;
a generator configured to generate electrical power from mechanical power delivered by the engine;
a switched-mode power supply, comprising an inverter, configured to convert the electrical power from the generator to output power, the output power comprising at least one of welding-type power or battery charging power; and
control circuitry configured to:
receive, from a user input device, a first input selecting at least one of a first mode representative of a first welding-type process or a second mode representative of a first battery charging mode;
when the first mode is selected, control the switched-mode power supply to output welding-type power; and
when the second mode is selected, control the switched-mode power supply to output battery charging power; and
one or more output indicators configured to indicate a status of battery charging when the second mode is selected, wherein the one or more output indicators indicate at least one of: charging in a rapid charging mode, charging in a trickle charging mode, a battery test mode, an output voltage, or a charging error.

* * * * *